Patented Oct. 27, 1970
3,536,239
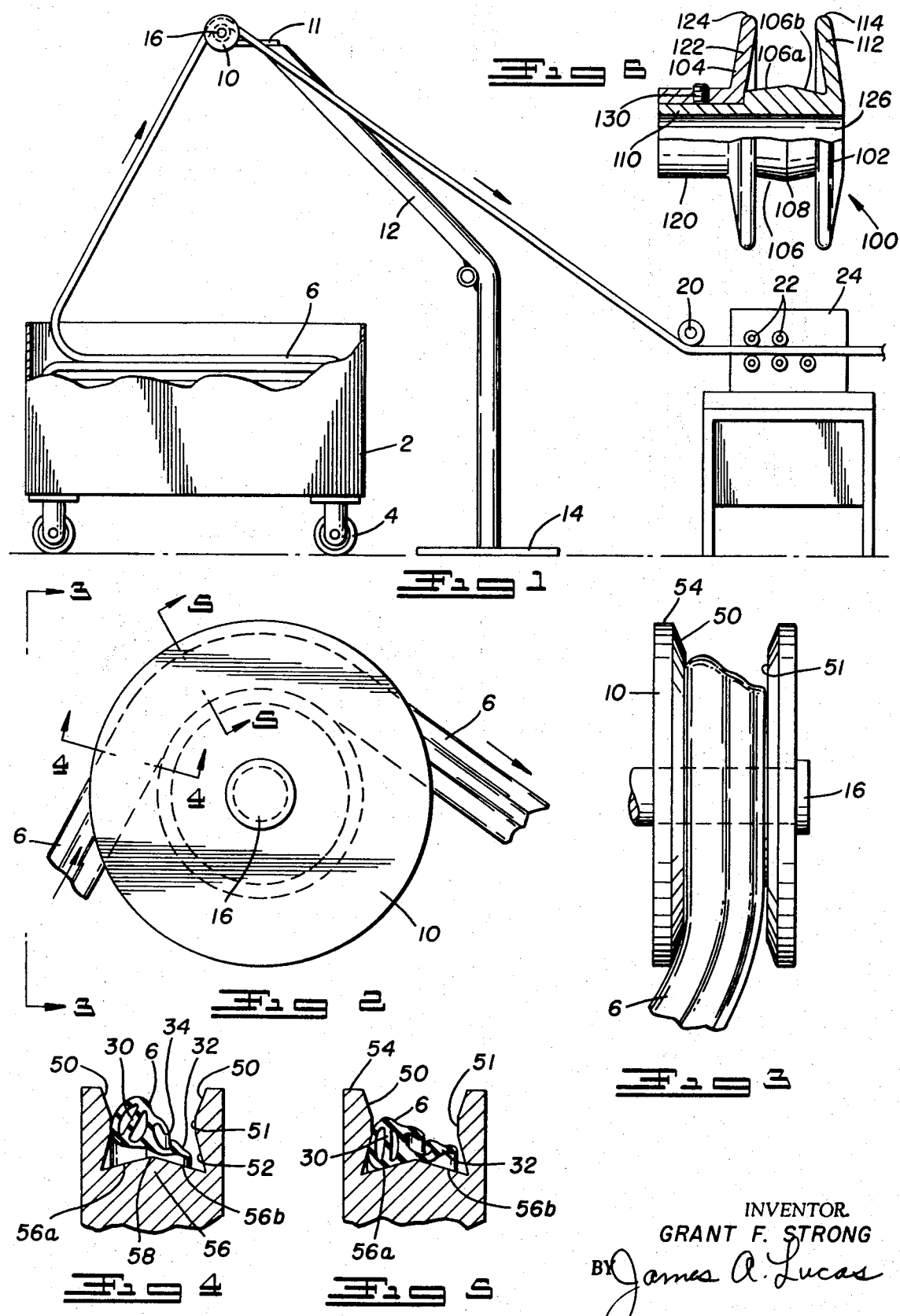
INVENTOR.
GRANT F. STRONG
BY James A. Lucas
ATTORNEY

United States Patent

[11] 3,536,239

| [72] | Inventor | Grant F. Strong |
| | | Wabash, Indiana |
| [21] | Appl. No. | 815,592 |
| [22] | Filed | April 14, 1969 |
| [45] | Patented | Oct. 27, 1970 |
| [73] | Assignee | The General Tire & Rubber Company |
| | | a corporation of Ohio |

[54] ANTI-TWIST PULLEY WHEEL
12 Claims, 6 Drawing Figs.

[52] U.S. Cl. .................................................. 226/1,
226/190; 29/121; 264/294, 264/320; 226/196
[51] Int. Cl. ..................................................... B65h 27/00
[50] Field of Search ........................................... 226/1,
190, 182, 184, 196; 264/294(Consulted), 320; 29/121

[56] References Cited
UNITED STATES PATENTS
3,319,293   5/1967   Gollos ........................... 226/190X Primary Examiner—Allen N. Knowles
Attorney—James A. Lucas, Frank C. Roth, Jr., and Harry F. Pepper, Jr.

ABSTRACT: A pulley device is used to feed a continuous length of an elastomeric extrusion of irregular cross section and of indefinite length from a basket, coil or other source of supply to a drill, slitter, flocker or other type of machine where the extrusion must be properly oriented or positioned with respect to the machine. The pulley device comprises a pulley wheel having a groove extending radially in from the periphery thereof to properly orient and untwist the extrusion. The groove is defined by a crowned face and a pair of sides that converge toward one another as they extend from the face to the periphery. The minimum width of the groove is normally slightly greater than the cross-sectional width of the extrusion.

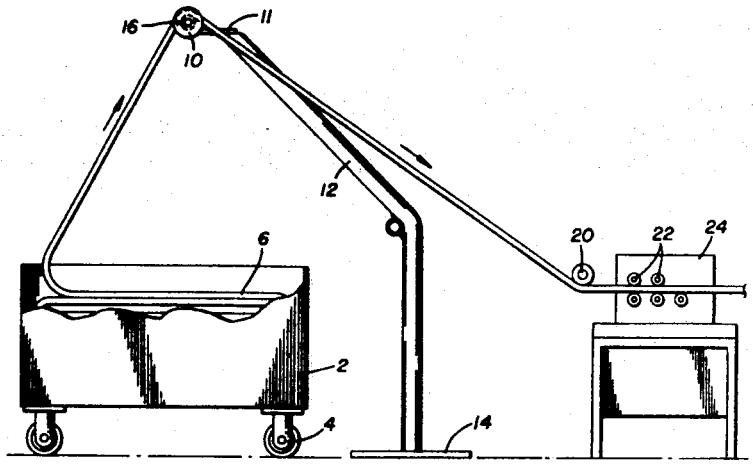

ANTI-TWIST PULLEY WHEEL

BACKGROUND OF THE INVENTION

Many rubber and plastic products used in cars, houses, appliances, and the like are formed by the process of extrusion, which involves expressing a polymer through an extrusion die at high pressures and elevated temperatures, followed by cooling or heating to cure or harden the extrusion. In the production of extruded sponge products, a blowing agent is used to form a low density cellular structure following extrusion. After the extrusion is cured or hardened, it is wound on a reel or is fed into a large basket or container or is otherwise stored in continuous lengths of several hundred feet.

At this point, the extrusion is not a finished product but must be drilled, sliced, flocked, cut to length or combined with one or more other components to produce the final product. This usually involves feeding the extrusion from the reel or basket to any one of a number of secondary operations requiring precise positioning of the extrusion to carry out the operation. When fed from a large basket or reel to such an operation, the extrusion often becomes twisted, and must be manually untwisted in order to prevent jamming and hang-up in the machine used to perform the operation.

SUMMARY OF THE INVENTION

One object of the present invention is to provide means for continuously feeding and orienting a rubber extrusion for a post-forming operation.

Another object is the provision of a pulley wheel having a groove that is shaped to straighten out any twists that may occur in an irregularly shaped extrusion passing therearound.

These and other objects are achieved in the manner to be hereinafter described by use of a novel pulley wheel having a peripheral groove that serves to orient and untwist the extrusion as it passes therearound. The groove is defined by a crowned face and a pair of sides that converge toward one another as they extend outwardly from the face toward the periphery of the groove.

BRIEF DESCRIPTION OF THE DRAWINGS

FIG. 1 is an elevational view of an extrusion being drawn out of a basket over a pulley wheel and being fed to a machine.

FIG. 2 is an enlarged view of the pulley wheel showing the extrusion passing therearound.

FIG. 3 is a view taken along lines 3-3 of FIG. 2.

FIG. 4 is a cross-sectional view taken through the plane defined by lines 4-4 of FIG. 2.

FIG. 5 is a cross-sectional view taken along lines 5-5 of FIG. 2, and

FIG. 6 is a partial cross-sectional view of another pulley representing an alternative embodiment of the present invention.

DETAILED DESCRIPTION OF THE INVENTION

Referring now to FIG. 1, there is shown a large basket 2 on wheels 4 containing for example several hundred feet of a rubber extrusion 6 coiled therein. The extrusion is shown being withdrawn and fed over a pulley wheel 10 mounted on a plate 11 on top of a support 12 secured to a stand 14 resting on the floor. The pulley wheel is mounted on the end of a shaft 16 which is adapted to rotate in bearings mounted on a pair of pillow blocks (not shown) bolted or otherwise secured to plate 11. The support 12 rests on the floor beside the basket and is angled to position the pulley 10 directly over the basket 6.

After passing over the pulley 10, the extrusion typically passes under an idler roller 20 and through a series of small rollers 22 in a suitable machine 24 which is adapted to insert a metal carrier strip into a slot within the extrusion, but which in other applications can perform any one of a number of post-extrusion operations such as drilling, slitting or the like.

FIG. 2 is an enlarged view of the pulley wheel 10 showing the extrusion 6 passing therearound. The wheel is pressed on shaft 16 which is rotatably mounted in suitable bearings as previously mentioned.

FIG. 3 is an end view of the wheel 10 and shaft 16 showing the extrusion 6 entering the groove of the wheel at a slight angle from the left. As the extrusion is drawn from the basket, it uncoils generally in a pattern which is the reverse of that which it formed when it was laid into the basket. Thus the path of the extrusion between the basket and the wheel and the angle that it forms with respect to the wheel is constantly changing as the extrusion is uncoiled. Accordingly, the extrusion may enter the groove of the wheel at an angle as great as 30 or 40° to either side of the center line of the wheel.

An elastomer can be extruded in an indefinite number of shapes and cross sections. The cross section of the extrusion seen in FIGS. 2 and 3 is shown in FIGS. 4 and 5, and represents a sponge rubber weather strip of the type used in an automobile. The extrusion 6 is composed of a generally tubular portion 30, a lip 32 and a slot 34. Holes are drilled in the weather strip after which it receives a metal carrier strip in the slotted opening. The extrusion is then cut to length. For these operations to be carried out continuously and automatically, the weather strip must be properly oriented as it is fed to the drilling and assembling stations.

The cross-sectional shape of one embodiment of the pulley wheel groove is shown in FIGS. 4 and 5. The groove is composed of two sides and a bottom or face. Each side has an outer surface 50, an inner surface 52 and an intermediate surface 51. The two outer surfaces 50 of the sides converge toward one another and serve to guide the extrusion into the groove without damage to the edges of the extrusion. The junction between the periphery 54 of the wheel and this outer surface 50 may be rounded if desired and the outer surface itself may be curved rather than flat as shown. Generally, the two outer surfaces 50 will form an angle of between about 10 and about 30° with a plane perpendicular to the axis of the pulley. Thus the angle of convergence of these two surfaces will be between about 20 and about 60°. The minimum distance between two parallel intermediate surfaces 51 is slightly greater than the maximum width of the extrusion to allow the extrusion to easily enter the groove. For this, a clearance of between about ⅛ inch and ¼ inch is normally adequate. From the intermediate surfaces 51, the inner surfaces 52 of the sides diverge from one another to the bottom of the groove. The angle of divergence is between about 10° and about 50°. Thus, each of the inner surfaces forms an angle of between about 5 and about 25° with a plane perpendicular to the axis of the pulley wheel.

The face 56 of the groove is composed of two beveled surfaces 56a, 56b intersecting to form a crown 58. The crown is located approximately midway between the sides of the groove and represents the minimum depth of the groove while the maximum depth is at the junction between the sides and the bottom. Each surface 56a, 56b is beveled at an angle of about 10 to 20° from the axis of the pulley.

As the extrusion passes around the pulley wheel, the tension on the extrusion created by its own weight and by the pull exerted by the machine, urges the extrusion into the groove. The extrusion may have a clockwise or a counterclockwise twist and can approach the pulley from the front or at any oblique angle from the left or right hand side. If the extrusion enters the groove from the left for example as shown in FIG. 3, the tubular portion 30 contacts the beveled surface 50 of the left side which guides the extrusion into the groove. If the extrusion has a counterclockwise twist, the taper of the surface 50 will keep the portion 30 elevated as shown in FIG. 4 while the lip 32 enters the groove after which the tension on the extrusion will produce a clockwise torque which will cause it to pivot around the crown 58 and to be fully seated in the groove after which the inner taper 52 of the groove anchors the extrusion and prevents further twisting.

If, on the other hand, the extrusion is twisted in a clockwise direction, it would normally tend to keep rolling in the same direction as it enters the groove of the pulley. However as the tension on the extrusion forces it into the bottom of the groove, it contacts the crown 58 and the tension produces a counterclockwise torque which causes the tubular portion 30 to pivot counterclockwise about the crown into the bottom of the groove. If the extrusion enters the pulley from the right hand side, the forces will operate in the same manner to straighten out any twists in the extrusion. For instance, a clockwise twist will be corrected by the right hand tapered surface 50 while a counterclockwise twist will be counteracted by the pivotal torque effect in the clockwise direction about the crown 58.

The crown is shown midway between the two sides of the pulley wheel. In some instances it is advantageous to position the crown 58 in an offcenter location. For example, where one side of the extrusion has a very large cross section and the other side has a comparatively small cross section, the crown can be moved toward the side of the pulley wheel away from the large cross section. This enables the extrusion to more readily pivot about the crown and seat itself in the groove.

The tension on the extrusion is one of the factors that helps to untwist the cord as it passes over the pulley. Increasing the vertical distance between the basket and the pulley will increase the amount and thus the weight of the extrusion being lifted from the basket, resulting in a corresponding increase in the tension exerted on the extrusion. The pulley wheel can be mounted on a telescoping support to provide means for readily changing the height of the wheel depending on the nature of the extrusion and the amount of twisting that occurs as the extrusion is drawn from the basket.

The groove of the pulley wheel should be sufficiently deep so that the extrusion is seated below the taper reversal point 51 where the outer taper and inner taper converge. Further, as the angle that the extrusion makes with respect to the center line of the pulley wheel is increased, the depth of the groove should be correspondingly increased. The diameter of the wheel should be sufficient to prevent crimping of the extrusion as it passes therearound.

The pulley wheel is fabricated from any suitable material. For example, it can be machined out of steel bar stock or the like. Alternatively, it can be cast, for example, as in two halves which are then bolted together to form the wheel.

Yet another alternative is seen in FIG. 6 showing a two piece pulley wheel 100 composed of a flanged base 102, and a flanged sleeve 104 secured to the base by a set screw 130 or other suitable securing means. The base 102 is composed of a pair of tapered surfaces 106a, 106b comprising the face 106 of the pulley wheel groove said surfaces intersecting to form a crown 108. One side 112 of the groove is composed of a flange integrally joined to and extending radially away from face 106. Extending axially from the face 106, opposite the flange, is a tubular projection 110, the outer diameter of which is slightly smaller than the minimum diameter of the base. The sleeve 104 is composed of a tubular sleeve portion 120 and a radially outwardly projecting flange which forms the left hand side 122 of the groove. The sleeve 104 telescopes over the tubular projection 110 and is secured thereto by a set screw 130. A shoulder is formed at the juncture between the projection 110 and the groove face 106. This shoulder limits the axial movement of the side 122 toward the side 112 thus defining the minimum width of the groove. The two sides 112 and 122 of the wheel groove taper toward one another as they extend radially outwardly from the face of the groove to the rounded peripheral edges 114, 124 of the wheel. These rounded edges serve the same function as the outer converging sides 50 of the wheel shown in FIGS. 2—5 and previously described in detail. They help to guide the extrusion into the groove and to untwist the extrusion when it has a tendency to roll over itself as it enters the groove.

The wheel of FIG. 6 has an additional advantage over the embodiment shown in FIGS. 2—5 in that the width of the groove can be varied to some extent by loosening the set screw, adjusting the side 122 toward or away from side 112 and retightening the screw. Thus, a variety of extrusions, having differing widths can be handled in this manner.

The pulley wheel has a bore 126 extending therethrough adapted to receive a shaft. The wheel may be secured to the shaft by a set screw or key or may be pressfitted onto the shaft. The other end of the shaft is then rotatably supported in suitable bearings or the like. Alternatively, the pulley wheel may be provided with ball bearings or the like and can be designed to rotate about a stationary shaft.

The use of the novel pulley wheel of the present invention is not limited to rubber extrusions of irregular shape. Instead, it can be used to guide other lengths of noncircular products such as flat sheets of rubber, paper or the like.

The foregoing is intended as a full and complete description of the invention, including details of its use and various embodiments. It is not intended as a limitation of the invention, said limitations defined by the following claims.

I claim:

1. A pulley wheel used to untwist an elastomeric extrusion of irregular cross section and of indefinite length as it passes around the wheel, said wheel having a peripheral portion with a groove extending radially in therefrom said groove having two sides and a face joining the two sides, the face having a crown between said sides whereby the depth of the groove is greater at the sides than at the crown, the sides converging toward one another as they extend radially outwardly from the face toward the peripheral portion of the wheel.

2. A pulley wheel according to claim 1 wherein the angle of convergence of the sides is between about 10° and about 50°.

3. The pulley wheel of claim 2 wherein the minimum width of the groove is at least as great as the maximum cross-sectional dimension of the extrusion.

4. The pulley wheel of claim 3 wherein the radial distance between the crown and the point of minimum width of the groove is a least as great as the radial thickness of the extrusion when in said groove.

5. A pulley wheel mounted upon a shaft and having a peripheral groove around which an elastomeric extrusion passes, said groove defined by a pair of sides and a face, said face formed by a pair of surfaces, each inclined at an angle of between about 10 and about 20° away from the axis of the pulley and intersecting to form a crown between the two sides, the depth of the groove at the crown being less than at the sides, each of said sides as it extends radially away from the face initially tapering toward the other at an angle of between about 5° and about 25° and for a distance such that the minimum width of the groove is at least about ⅛ inch wider than the maximum cross-sectional dimension of the extrusion to be passed around the pulley after which the sides diverge from one another and join the periphery of the wheel.

6. A wheel according to claim 5 wherein the sides diverge from one another toward the periphery at an angle of between about 20° and about 60°.

7. A wheel according to claim 5 wherein the minimum width of the groove is near the periphery of the wheel and each side radially outwardly from the location of minimum width forms a continuously curved surface in conjunction with the periphery.

8. The wheel according to claim 5 wherein one of the sides is axially adjustable toward and away from the other of the sides to vary the width of the groove.

9. A two-piece pulley wheel having a peripheral groove around which an elastomeric extrusion of irregular cross section passes the face of the groove defined by a pair of beveled surfaces intersecting to form a crown and integrally joined to one side of the groove, a tubular portion projecting axially away from the beveled surfaces opposite to the integrally joined side, the second side joined to an annular sleeve slidably engaged with the projecting circular portion and held thereto by suitable securing means.

10. The pulley according to claim 9 wherein said suitable securing means comprises a set screw in the annular sleeve.

11. The pulley according to claim 10 including an abutment shoulder at the juncture between the bottom of the groove and the axially projecting tubular portion.

12. The method of conveying a continuous length of flexible and stretchable elastomeric extrusion of noncircular shape without twisting, comprising passing the extrusion into and around a circular groove, applying tension to the extrusion as it passes around the groove and exerting a twisting torque on the extrusion as it enters the groove in the opposite direction to the direction that the extrusion is twisted as it enters the groove.